(No Model.)
H. K. PORTER.
BICYCLE STAND.
No. 588,291. Patented Aug. 17, 1897.
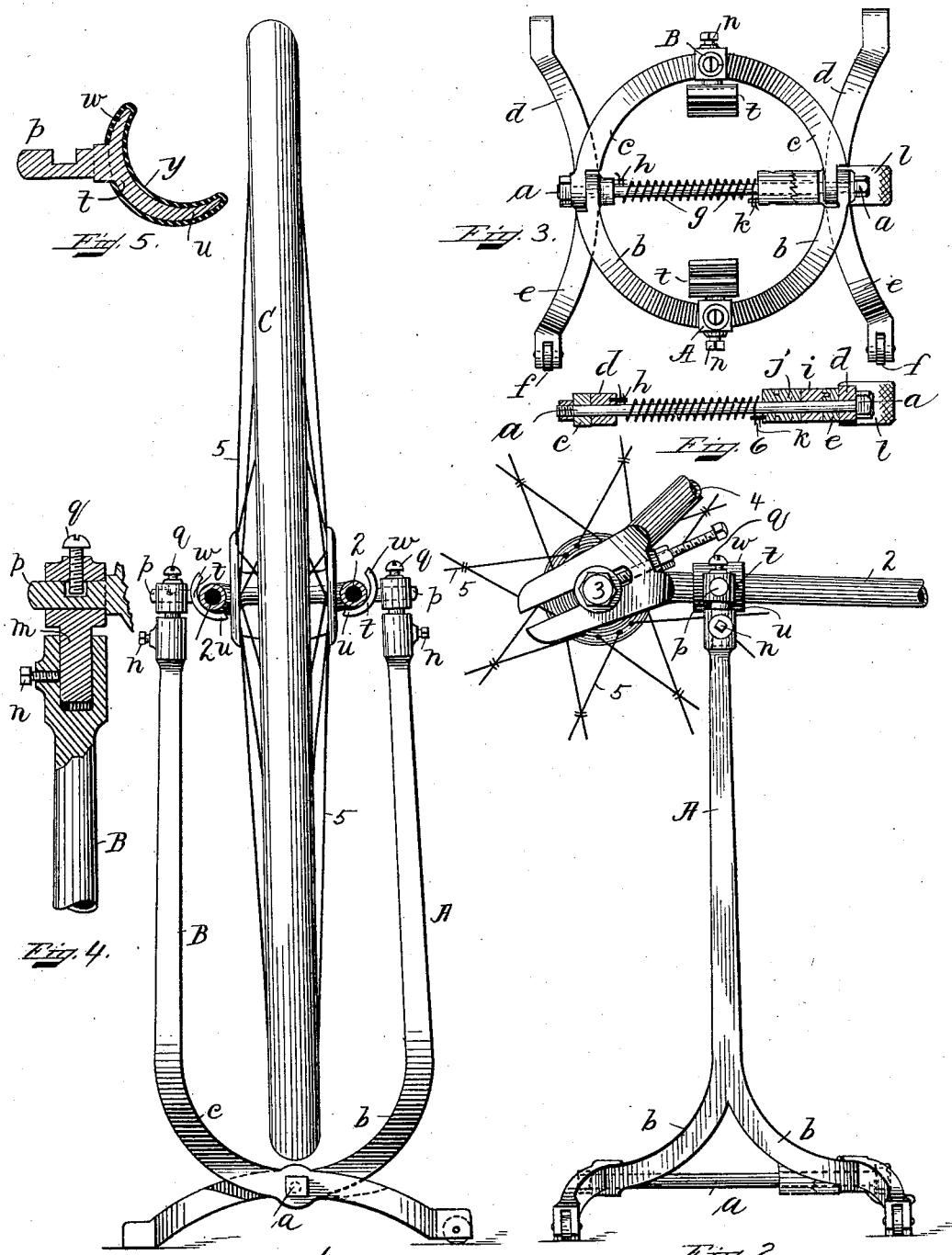

UNITED STATES PATENT OFFICE.

HENRY K. PORTER, OF CHELSEA, MASSACHUSETTS.

BICYCLE-STAND.

SPECIFICATION forming part of Letters Patent No. 588,291, dated August 17, 1897.

Application filed December 30, 1895. Serial No. 573,740. (No model.)

*To all whom it may concern:*

Be it known that I, HENRY K. PORTER, of Chelsea, in the county of Suffolk and State of Massachusetts, have invented a new and useful Improvement in Bicycle-Stands, which will, in connection with the accompanying drawings, be hereinafter fully described, and specifically defined in the appended claims.

In said drawings, Figure 1 is an elevation of my improved stand, taken as in the lengthwise direction of the bicycle when mounted therein, the bicycle-wheel being shown in the stand. Fig. 2 is an elevation, taken as at the right of Fig. 1, with the central portion of a rear wheel shown in the stand. Fig. 3 is a top plan view of Figs. 1 and 2, but without the bicycle or any part thereof. Fig. 4 is a detached enlarged elevation of one of the standards and attached parts shown partly in vertical section. Fig. 5 is a detached vertical section through one of the crescent-like holders that grip and hold the bicycle.

This invention relates to stands in which bicycles are placed and held when not in use; and it consists in a stand having two uprights in which the bicycle rests, said standards at their lower ends being forked and each provided with two feet and being pivoted together upon a rod on which is arranged a coiled spring and with a treadle attached to one of said standards, so that when depressed the standards are spread apart at top to receive the wheel of the bicycle and when liberated said spring forces them toward each other to hold the wheel, while an adjustable puppet is seated in the top of each standard and an adjustable crescent-like holder is arranged in each puppet to receive the side tubes of the bicycle.

Referring again to said drawings, A and B are the bicycle-supporting uprights of my improved stand, each of which is forked at its lower portion, as shown in Figs. 2 and 3, said two standards being mounted on rod $a$, the forked parts of standard A, above rod $a$, being marked $b$ $b$, while said forked parts of standard B are marked $c$ $c$, and the forked parts of standard A, below rod $a$, are marked $d$ $d$, while said parts of standard B are marked $e$ $e$. In the ends of parts $e$ $e$ I arrange a pair of casters or trucks $f$ for easy change of location of the stand and for its easy adjustment.

Upon rod $a$ I arrange the coiled spring $g$, which, as shown, is at one end anchored, as at $h$, to a fork $b$ of standard A, while its opposite end is anchored at $k$ to hub $j$, mounted on rod $a$, and which engages hub $i$ by means of ratchet-teeth, said hub $i$ being locked in a fork $e$ of standard B.

A treadle $l$ is formed upon a fork $d$ and, if desired, may be formed at its opposite side upon $e$, and when said treadle is depressed standards A and B are swung apart and the tension on spring $g$ is increased, while the liberation of the treadle allows rod $a$ to rise and standards A and B to move toward each other.

A puppet $m$ is seated in the head of standards A and B and when duly positioned is locked by screw $n$, and a swiveling holder $t$ is by its stem $p$ seated in said puppets, and a screw $q$, inserted in the heads of puppets $m$, secures the holders from being withdrawn from the puppets, yet allows it a free limited rotation, so that the part $t$ will conform to the side tubes of the bicycle.

The holder $t$ is crescent-shaped, so that a line passing from the end of the lower arm $u$ to the end of the upper arm would be practically at forty-five degrees to the horizon, as shown in Fig. 5, and so that when the side tubes of the bicycle are laid in said holder they cannot be readily removed upward or downward except by moving the standards apart. A rubber covering $y$ is secured upon said holders to protect the enamel of the bicycle-tubes.

In Fig. 1 the rear wheel of the bicycle is shown at C and as supported by the side tubes 2, also shown in Fig. 2, and as connected with the brace-tubes 4, and at the junction of these tubes wheel C is mounted upon its axle 3, to which the spokes 5 are attached.

In Fig. 1 the axle of wheel C is omitted and the brace-tubes 2 are shown in section, the better to show the parts.

Having thus described my invention, what I claim as new, and desire to secure by Letters Patent, is—

1. A bicycle-stand having standards A and B formed at their top to receive and support the bicycle, and at the bottom extended to form the feet or bases $b$, $b$, and $c$, $c$, a pivot-rod $a$ inserted in said parts $b$, $b$, and $c$, $c$, and a coiled spring $h$ mounted on said rod and at one end anchored at $g$ in part $b$ and at its opposite end anchored to part $k$ secured to part $e$, so that the action of said spring tends to react to bring parts A, B, nearer together at top when released, for the purpose specified.

2. A bicycle-stand formed with standards A and B provided at top with means for supporting the bicycle, and at bottom formed respectively with feet $d$, $e$, with a pivot-rod $a$ inserted in said feet, a coiled spring $g$ mounted on said rod and anchored to said standards to swing the same toward each other, and a treadle $l$ formed upon one of said standards by which to open the same, substantially as specified.

3. In a bicycle-stand, the combination of standards A, and B, a puppet $m$ rotatably adjusted in the top of said standards and locked by a set-screw: a crescent-like slot $t$ formed with a stem $p$ arranged in the upper part of said puppet, and a screw $q$ seated in the top and loosely entering a recess in said stem $p$ to hold the same in place, but to allow it requisite rotation in its seat for the purpose described.

4. In a bicycle-stand, the crescent-like support formed with a stem $p$ to extend through and be supported by the upright, a holding-screw $q$ seated in the top of the upright and a seat formed in said stem $p$ to loosely receive the lower end of said screw to retain said stem in place but to allow the same to rotate for the purpose specified.

HENRY K. PORTER.

Witnesses:
T. W. PORTER,
M. E. BOWDITCH.